US010782443B2

(12) United States Patent
Womack (10) Patent No.: US 10,782,443 B2
(45) Date of Patent: Sep. 22, 2020

(54) OPTICAL FILTER

(71) Applicant: Geospace Technologies Corporation, Houston, TX (US)

(72) Inventor: Willard Womack, Austin, TX (US)

(73) Assignee: Geospace Technologies Corporation, Houston, TX (US)

( * ) Notice: Subject to any disclaimer, the term of this patent is extended or adjusted under 35 U.S.C. 154(b) by 487 days.

(21) Appl. No.: 15/529,443

(22) PCT Filed: Dec. 3, 2015

(86) PCT No.: PCT/US2015/063673
§ 371 (c)(1),
(2) Date: May 24, 2017

(87) PCT Pub. No.: WO2016/099923
PCT Pub. Date: Jun. 23, 2016

(65) Prior Publication Data
US 2018/0011217 A1    Jan. 11, 2018

Related U.S. Application Data

(60) Provisional application No. 62/093,204, filed on Dec. 17, 2014.

(51) Int. Cl.
*G02B 6/32* (2006.01)
*G01V 8/02* (2006.01)
(Continued)

(52) U.S. Cl.
CPC ............. *G01V 8/02* (2013.01); *G01M 5/0091* (2013.01); *G01V 8/24* (2013.01); *G02B 6/2937* (2013.01);
(Continued)

(58) Field of Classification Search
CPC ......... G01V 8/02; G01V 8/24; G01M 5/0091; G02B 6/2937; G02B 6/2938; H04Q 9/00; G08C 23/06; G01D 5/353
See application file for complete search history.

(56) References Cited

U.S. PATENT DOCUMENTS 4,787,693 A   11/1988   Kogelnik et al.
4,887,883 A   12/1989   Darbut et al.
(Continued)

FOREIGN PATENT DOCUMENTS

JP   402293803 A   5/1990
JP   2002071970 A   12/2002
(Continued)

OTHER PUBLICATIONS

EP Search Report dated Jun. 6, 2018 for European Patent Application No. 15870668.9 filed Mar. 12, 2015; 9 pages.
(Continued)

*Primary Examiner* — Ellen E Kim
(74) *Attorney, Agent, or Firm* — Blank Rome LLP (57) ABSTRACT

A device. At least some example embodiments are a device including a filter element configured to receive optical energy from a first optical fiber. The filter element is reflective in a preselected band of optical wavelengths. A first lens is configured to receive optical energy transmitted through the filter element. A shell is disposed about the optical filter and the first lens; surfaces of the first lens, the filter element and the shell form a first boundary portion of an internal volume of an interior of the shell. A fluid is sealably disposed within the internal volume.

22 Claims, 4 Drawing Sheets

(51) Int. Cl.
  *G08C 23/06* (2006.01)
  *G01V 8/24* (2006.01)
  *H04Q 9/00* (2006.01)
  *G02B 6/293* (2006.01)
  *G01M 5/00* (2006.01)
  *G01D 5/353* (2006.01)

(52) U.S. Cl.
  CPC ............... *G08C 23/06* (2013.01); *H04Q 9/00* (2013.01); *G01D 5/353* (2013.01); *G02B 6/2938* (2013.01)

(56) References Cited

U.S. PATENT DOCUMENTS

| | | | |
|---|---|---|---|
| 5,497,233 | A | 3/1996 | Meyer |
| 5,664,864 | A | 9/1997 | Kuth |
| 5,778,127 | A * | 7/1998 | Gilliland .............. G02B 6/4204 385/92 |
| 6,061,487 | A | 5/2000 | Toyama et al. |
| 6,366,390 | B1 | 4/2002 | King et al. |
| 6,408,119 | B1 | 6/2002 | Meltz et al. |
| 6,655,849 | B1 | 12/2003 | Malavieille et al. |
| 6,778,278 | B2 | 8/2004 | Ahmadvand et al. |
| 7,231,116 | B2 | 6/2007 | Tanaka et al. |
| 7,688,673 | B2 | 3/2010 | Ronnekleiv et al. |
| 2002/0044713 | A1 | 4/2002 | Hung |
| 2002/0081067 | A1* | 6/2002 | Brun .................. G02B 6/29364 385/34 |
| 2002/0106149 | A1 | 8/2002 | Tehrani |
| 2003/0123781 | A1 | 7/2003 | Rockwell et al. |
| 2004/0156580 | A1 | 8/2004 | Baumann et al. |
| 2004/0239940 | A1 | 12/2004 | Gurunathan et al. |
| 2006/0119857 | A1 | 6/2006 | Steffens et al. |
| 2007/0146721 | A1 | 6/2007 | Barcelos et al. |
| 2008/0112261 | A1 | 5/2008 | Ronnekleiv et al. |
| 2008/0112264 | A1 | 5/2008 | Ronnekleiv et al. |
| 2009/0263040 | A1 | 10/2009 | Rolland et al. |
| 2010/0014817 | A1* | 1/2010 | Liu .................... G02B 6/02314 385/99 |
| 2010/0025032 | A1 | 2/2010 | Smith et al. |
| 2011/0149294 | A1 | 6/2011 | Song |
| 2012/0067118 | A1 | 3/2012 | Hartog et al. |
| 2012/0194823 | A1 | 8/2012 | Moore et al. |
| 2013/0183003 | A1 | 7/2013 | Cairns |
| 2014/0046599 | A1 | 2/2014 | Smith et al. |
| 2014/0078508 | A1 | 3/2014 | Aota |
| 2014/0112094 | A1 | 4/2014 | Fernihough |
| 2014/0140655 | A1 | 5/2014 | Chakravarty et al. |
| 2014/0160487 | A1 | 6/2014 | Huang et al. |
| 2014/0312903 | A1 | 10/2014 | Olsson et al. |
| 2014/0339411 | A1 | 11/2014 | Lagace et al. |
| 2015/0009507 | A1 | 1/2015 | Yasuno et al. |
| 2015/0198772 | A1* | 7/2015 | Nakama .............. G02B 6/3885 385/80 |

FOREIGN PATENT DOCUMENTS

| | | |
|---|---|---|
| WO | 03098156 A1 | 11/2003 |
| WO | 2012082796 A1 | 6/2012 |

OTHER PUBLICATIONS

Search Report and Written Opinion dated Mar. 23, 2016 for PCT application No. PCT/US2015/063699 filed Dec. 3, 2015; 10 pages.
Fu, Yunfei et al., "Efficient adiabatic silicon-on-insulator waveguide taper," Photon. Res., Jun. 2014, vol. 2, No. 3.
Karppinen, Mikko et al., "Multiplayer Single-mode Polymeric Waveguides by imprint patterning for optical interconnects," VTT Technical Research Centre of Finland, Feb. 2014.
Search Report and Written Opinion dated Feb. 19, 2016 for PCT application No. PCT/US2015/063680 filed Dec. 3, 2015; 15 pages.
EP Search Report dated May 17, 2018 for European Patent Application No. 15870666.3; 7 pages.
"Dupont Hytrel Thermoplastic Polyester Elastomers Design Guide"; copyright DuPont; (Nov. 2013) reference No. HYE-A11157-00-00915; 85 pages.
"3M Flourinert Electronic Liquid FC-72 Product Information" May 2000, 3M IPC, 4 pages.
Search Report dated Jul. 17, 2018 for European Patent Application No. 15870664.8, 6 pages.
International Search Report for PCT Application No. PCT/2015/063673, dated Feb. 19, 2016.

* cited by examiner

OPTICAL FILTER

CROSS-REFERENCE TO RELATED APPLICATIONS

This application claims the benefit of U.S. Provisional Application Ser. No. 62/093,204 filed Dec. 17, 2014 and titled "Pressure Equalized Passive Bulk Optic Thin Film Optical Filter". The provisional application is incorporated by reference herein as if reproduced in full below.

BACKGROUND

Permanent hydrocarbon reservoir monitoring is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based permanent reservoir monitoring faces significant challenges that are not faced by land-based permanent monitoring systems. This is particularly true of ocean bottom installations as water depths extend into the 1000 meter range and beyond. In particular, components comprising the sensors and associated data communication systems disposed on the sea floor may be exposed to sea water, high humidity and condensation, and subject to hydrostatic stresses arising in the submarine environment.

BRIEF DESCRIPTION OF THE DRAWINGS

For a detailed description of exemplary embodiments, reference will now be made to the accompanying drawings in which.

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Marine environment" shall mean an underwater location regardless of the salinity of the water. Thus, even an underwater location in a body of fresh water shall be considered a marine environment.

"Sea floor" shall mean the boundary of a body of water and the underlying sediment or rock. The term sea floor shall not imply anything regarding the salinity of the water, and thus even the boundary of a body of fresh water and the underlying sediment or rock shall be considered a sea floor.

"Surface" in relation to the location of a physical object shall mean any location 100 feet below mean sea level and above.

"Optical wavelengths" shall mean wavelengths in the electromagnetic spectrum from 1000 microns ($\mu$m) to 0.2 nanometers (nm).

"Low index of refraction" shall mean an index of refraction of 1.5 or lower.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various example devices and methods are directed to components of permanent hydrocarbon reservoir monitoring systems used in marine environments (e.g., in the range of 100 to 3000 meters of water depth). Permanent in this context indicating that the example systems can be used in reservoir monitoring where the various devices for monitoring are left on the sea floor indefinitely; however, the example systems can be used in any reservoir monitoring context. More particularly still, at least some of the various embodiments are directed to optical-based permanent reservoir monitoring in marine environments. The specification first turns to an illustrative system to orient the reader, and then to specifics regarding devices employed in conjunction with such a system.

Figure 1:
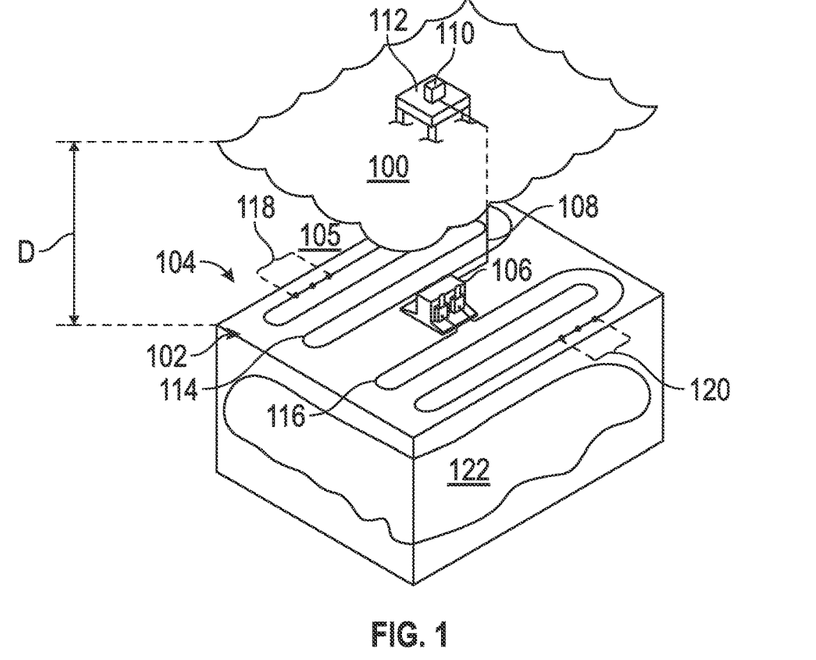
FIG. 1 shows a perspective cut-away view of a hydrocarbon reservoir monitoring system in accordance with at least some embodiments.

FIG. 1 shows a perspective cut-away view of a portion of a marine environment comprising a permanent reservoir monitoring system in accordance with at least some embodiments. In particular, FIG. 1 shows the surface 100 of the water. At a distance D below the surface 100 resides the sea floor 102, and below the sea floor 102 resides a hydrocarbon reservoir 122.

Within the environment of FIG. 1 resides an example reservoir monitoring system 104. In some cases, reservoir monitoring system 104 is installed and remains in place for an extended period of time, and thus may be considered a "permanent" reservoir monitoring system. The example reservoir monitoring system 104 comprises a base unit 106 installed on the sea floor 102. The base unit mechanically and communicatively couples to an umbilical cable 108 that extends from the base unit 106, through water body 105, to a computer system at the surface. In the example system of FIG. 1, the computer system 110 may reside on a vessel 112 floating on the surface 100. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables discussed more below, are communicatively coupled to the computer system 110.

A reservoir monitoring system may comprise at least one sensor cable, and in the example system of FIG. 1 the reservoir monitoring system 104 comprises two sensor cables 114 and 116. In the system of FIG. 1, each sensor cable 114, 116 mechanically and communicatively couples to the base unit 106 on each end for redundancy of communication, in case of a communicative break along the sensor cable. The length of the sensor cables 114, 116 may vary depending upon the particular situation, and the length of sensor cables coupled to a base unit need not be the same. For example, in one situation a loop of sensor cable (e.g., sensor cable 114) may be on the order of 19 kilometers (km) in length, while another loop of sensor cable (e.g., sensor cable 116) may be on the order of 50 km.

Each sensor cable 114, 116 may comprise a plurality of seismic measurement devices, such as sensor devices 118 associated with sensor cable 114, and sensor devices 120 associated with sensor cable 116. While only three devices 118 are shown associated with sensor cable 114, in practice many hundreds or thousands of such sensor devices may be spaced along the sensor cable 114. Likewise, while only three sensor devices 120 are shown associated with sensor cable 114, in practice many hundreds or thousands of such sensor devices may be placed along the sensor cable 116. The sensor devices 118 and 120 need not, however, be evenly spaced along the sensor cables 114 or 116, and extended portions of the sensor cables may be without sensor devices. For example, lead-in portions of the sensor cable may have long expanses (e.g., multiple kilometers) within which no sensor devices are located.

The embodiments illustrated and discussed in the current specification herein developed in the context of an optical system—with no electrical current flowing along the umbilical cable 108 and/or the sensor cables 114, 116. Persons having ordinary skill will understand that the system described and claimed is not limited to optical-only systems, and mixed optical and electrical systems may be implemented in conformance with aspects of this disclosure.

The sensor devices may take any suitable form. For example, the sensor devices may be single-axis geophones, which measure minute changes in velocity. In some cases, the single-axis geophones may be gimbaled such that the geophones measure only vertical (i.e., aligned with the force of gravity) changes in velocity. In yet still other cases, the geophones may be three-axis geophones, which measure changes in velocity in all three spatial dimensions. In other cases, the sensor devices may be hydrophones which measure pressure or sound. In still other cases, multiple different kinds of sensor devices may be used in the same cable, including hydrophones and geophones. In some cases, the geophones and/or hydrophones may be passive optical devices, meaning the geophones and/or hydrophones are powered by optical energy conveyed along one or more optical fibers, and likewise modulate recorded data in the form of light along the same or different optical fibers. As described above, the data may be communicated to computer system 110. The optical signals may be demodulated to retrieve the recorded data for further processing by computer system 110, or, alternatively, by a data processing system onshore. In at least some embodiments, the optical signals may comprise a plurality of multiplexed signals such as a wavelength division multiplex (WDM) signal, including particular examples thereof, such as Dense Wavelength Division Multiplex (DWDM) signals. Thus, the optical fibers may include filters to separate, or de-multiplex, the multiplexed signals as described further below. The specification now turns to a discussion in greater detail of several components of reservoir monitoring systems in accordance with at least some embodiments. It is noted that the optical power and optical signal filtering in such passive reservoir monitoring systems may be accomplished by for example, using bulk optic DWDM thin film filters, using athermal waveguide gratings (AWG) integrated waveguide-based designs or fiber Bragg gratings (FBG). It would be understood by those skilled in the art having the benefit of the disclosure that the principles of the disclosure may be applied to any of these filter technologies.

Figure 2:
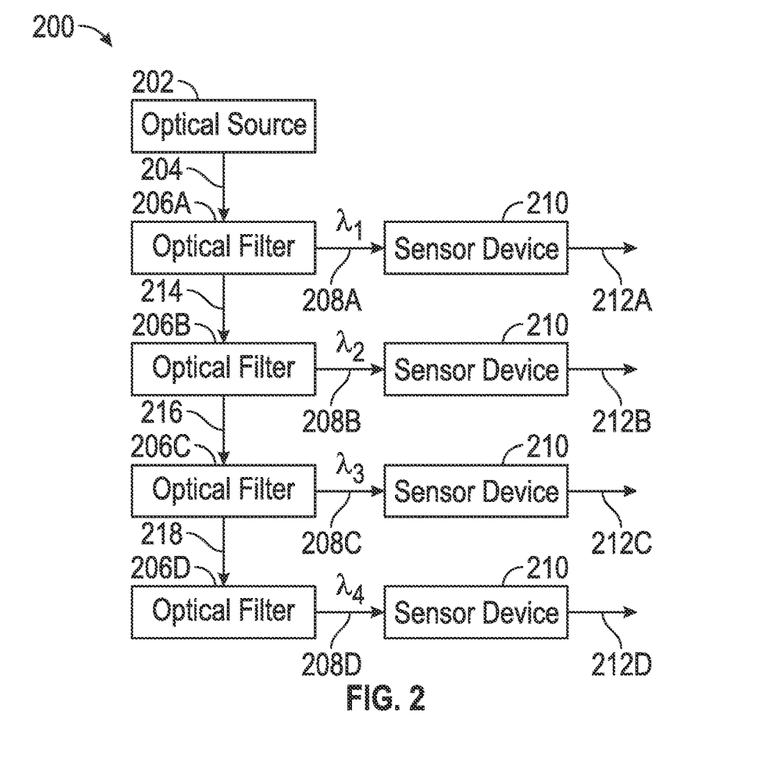
FIG. 2 shows a block diagram of a portion of the monitoring system of FIG. 1 in accordance with at least some embodiments.

Refer now to FIG. 2 illustrating a block diagram of an exemplary wavelength de-multiplexing portion 200 of a reservoir monitoring system 104 in accordance with at least some embodiments. An optical source 202 generates optical energy at one or more optical wavelengths. Optical source 202 may include, for example, solid-state lasers, semiconductor lasers and gaseous lasers. The optical energy generated by optical source 202 may be coupled into an optical fiber 204 portions of which may be disposed within umbilical cable 118 and other portions within one of sensor cables 114 or 116. The optical energy transported within optical fiber 204 is split or divided at optical filter 206A. A portion having an optical wavelength $\lambda_1$ within a reflective band of optical filter 206A is coupled into optical fiber 208A and then to a sensor device 210, which may correspond to one of sensor devices 118 or 120 in the example reservoir monitoring system of FIG. 1, wherein the sensor device 210 modulates data onto the optical energy as previously described. The modulated optical energy may then be communicated via optical fiber 212A to a detector (not shown in FIG. 2) which may be deployed, for example, on board vessel 112 and the data demodulated for analysis, by computer system 110. The remaining portion of the optical energy in optical fiber 204 that is outside the reflective band of optical filter 206A may be transmitted through optical filter 206A, coupled to optical fiber 214 and transmitted to optical filter 206B. A portion of the optical energy having an optical wavelength $\lambda_2$ within a reflective band of optical filter 206B is coupled into optical fiber 208B and then to another sensor device 210 which modulates data onto the optical energy. The modulated optical energy may then be communicated to a detector via optical fiber 212B. The remaining portion of the optical energy that is transmitted through optical filter 206B may be coupled via optical fiber 216 to optical filter 206C which couples a portion having an optical wavelength $\lambda_3$ within its reflective band into optical fiber 208C and to another sensor device 210. As before, sensor device 210 modulates data onto the optical energy which may be communicated to a detector via optical fiber 212C. The portion of the optical energy impinging on optical filter 206C outside its reflective band of optical wavelengths may be transmitted through optical filter 206C and coupled to optical filter 206D via optical fiber 218. Optical filter 206D couples a portion of the optical energy having optical wavelength $\lambda_4$ within its reflective band of optical wavelengths into optical fiber 208D which may be coupled to another sensor device 210. As previously described, optical energy carrying modulated data from the sensor device 210 may be coupled to a detector (not shown in FIG. 2) via an optical fiber 212D. While only four optical filters 206 and sensor devices 210 are shown, in practice many hundreds or thousands of such sensor devices may be placed along sensor cable. Further, in at least some embodiments, the optical energy in each of optical fibers 212A-212D may be multiplexed onto a single fiber and communicated to vessel 112, for example. And, in at least some embodiments, the optical energy of optical fibers 212A-212D may be traversing in either or both directions along a length of the fiber, and may be multiplexed and/or demultiplexed onto one of more other fibers by the splicing together of fibers 304 (FIG. 3) of filters of the same or different reflective optical wavelength. The multiplexed optical energy may be demultiplexed at the surface and coupled to separate detectors for demodulation of the data.

Figure 3:
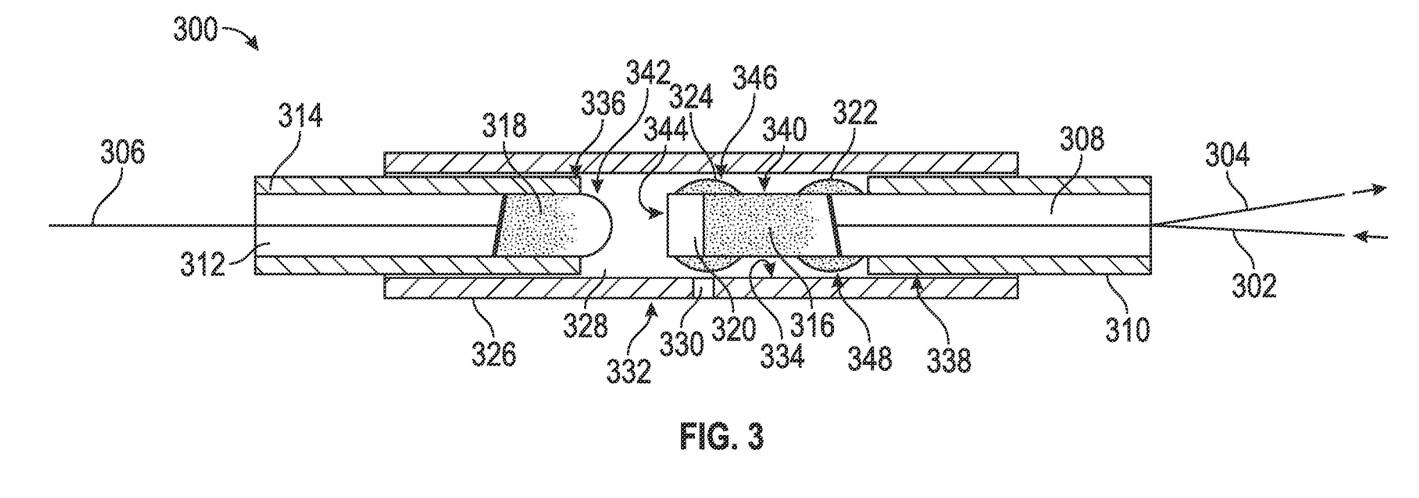
FIG. 3 shows a cross-section of an optical filter in accordance with at least some embodiments.

Refer now to FIG. 3, illustrating a cross-sectional view through a pressure equalized passive bulk optic thin-film optical filter 300 in accordance with at least some embodiments of an optical filter 202. Pressure equalized passive bulk optic thin-film optical filter 300 may be referred to as optical filter 300, for simplicity. Optical filter 300 may comprise optical fibers 302, 304 and 306. Optical fiber 302 may comprise an input port of optical filter 300. Optical fiber 304 may comprise a reflective output port of optical filter 300 and optical fiber 306 may comprise a transmissive output port of optical filter 300, as described further below. Optical fibers 302 and 304 may be disposed within ferrule 308 which itself may be disposed within another ferrule, ferrule 310. Ferrule 310 may comprise a metal, such as aluminum, and ferrule 308 may comprise a glass, such as borosilicate glass. These materials are exemplary and other metals and types of glass may be used in ferrules 310 and 308 respectively. Optical fiber 306 may be disposed within ferrule 312 which may also be comprised of a glass similarly to ferrule 308. Ferrule 312 may be disposed within another ferrule, ferrule 314 which may comprise a metal similar to ferrule 310. Ferrules 310 and 312 may help to align fibers 302 and 304 fibers, as described further below.

Optical filter 300 further includes lenses 316 and 318. Lens 316 may be disposed at an end of and attached to ferrule 308. Lens 318 may be disposed at an end of and attached to ferrule 312. A filter element 320 may be attached to lens 316 opposite its attachment to ferrule 308, and disposed in a spaced-apart relationship with lens 318. Lens 316 may be a beam expander lens such that optical energy impinging on lens 316 from optical fibers 302 is expanded by lens 316 into a collimated optical beam at filter element 320 such that filter element 320 is configured to receive optical energy from an optical fiber 302. Lens 316 may be attached to ferrule 308 by adhesive bead 322 and filter element 320 may be attached to lens 316 by adhesive bead 324. Adhesive beads 322 and 324 may comprise an epoxy resin adhesive. Filter element 320 may comprise a thin film optical filter comprising a stack of dielectric layers having different indices of refraction which alternate between layers (not shown in FIG. 3). The operation of filter element 320 will be described further below.

Figure 3A:
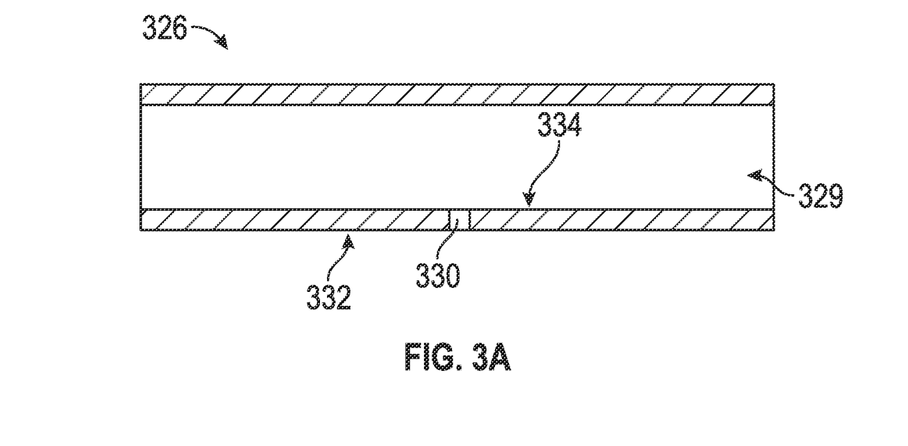
FIG. 3A shows a portion of the optical filter of FIG. 3 in accordance with at least some embodiments.

A shell 326, which may be tubular in form, may be disposed about ferrules 310 and 314, filter element 320 and lenses 316, 318. In at least some embodiments, shell 326 may comprise silica, although other materials may also be used. Shell 326 may help align the lenses and provide protection to the components disposed therein. Shell 326, ferrules 310 and 314, and portions of lens 318, filter element 320, lens 316 and adhesive beads 322 and 324 define an internal volume 328 within interior 329 (not shown in FIG. 3) of shell 326. (Interior 329 is more easily seen in FIG. 3A showing a cross-section of shell 326.) Stated otherwise, portions of an inner surface 334 of shell 326, outer surfaces 336, 338 of ferrules 310, 314, respectively, portions of surfaces 340, 342 of lenses 316, 318, respectively, surface 344 of filter element 320 and surfaces 346, 348 of adhesive beads 322, 324, respectively, each form a portion of a boundary of internal volume 328. Further, shell 326 may comprise a hole 330 which passes between an outer surface 332 of shell 326 and a portion of an inner surface 334 comprising a segment of the boundary of internal volume 328. Hole 330 may form a spiracle for the injection of a fluid into internal volume 328 as described further below.

In operation, optical filter 300 may be used to selectively separate portions of an optical field comprising a plurality of wavelengths. For example, optical filter 300 may be used in providing optical energy at a particular wavelength to one of a plurality of sensor devices 120. Optical energy having a plurality of wavelengths may be transmitted down optical fiber 302. The indices of refraction and thickness of the layers may be selected such that filter element 320 is reflective in a preselected band of optical wavelengths, and optical wavelengths in such a reflective band may be coupled to the reflective output port, optical fiber 304. As previously described, in at least some embodiments, filter element 320 may comprise a thin-film optical filter, in which a reflective band of optical wavelengths may be obtained by selecting indices of refraction of the materials comprising the layers and layer thicknesses such that each of the layers in the stack have a thickness that is a quarter of the preselected wavelength. In other words, such layers comprise quarter-wave "plates" at the preselected wavelength. Note that as the wavelength of an optical field is inversely proportional to the index of refraction of the medium in which it is propagating, the layers having a higher index of refraction will be thinner than the layers having a lower index of refraction at the preselected wavelength. Optical energy propagating in optical fiber 302 may impinge on filter element 320 via lens 316. Optical fiber 304 may be configured to receive optical energy in a preselected band of optical wavelengths reflected from filter element 320 wherein optical energy with wavelengths within the reflective band of filter element 302 may then be reflected back through lens 316 and into optical fiber 304. Optical energy whose wavelengths are outside the reflective band of filter element 320 may be transmitted through filter element 320, across a gap within internal volume 328, and impinge on lens 318. Optical fiber 306 may be configured to receive optical energy transmitted through filter element 320. More particularly, lens 318 may be configured to receive optical energy transmitted through filter element 320, and lens 318 may then focus the optical energy onto a transmissive output port comprising optical fiber 306.

Pressure balance may be obtained by disposing a fluid within internal volume 328. The fluid may, for example, be injected under vacuum into internal volume 328 through hole 330 in shell 326. After the fluid is in place, hole 330 may be sealed such that the fluid is sealably disposed within internal volume 328. In operation at depth, the fluid hydrostatic stresses imposed by the water body 105 on optical filter 300 may be balanced by the fluid within internal volume 328. A suitable fluid which may be used in at least some embodiments is 3M Flourinert electronic liquid FC-72 from 3M Company, St. Paul, Minn., however other fluids may be used. The low index of refraction of the 3M Flourinert electronic liquid FC-72, less than about 1.3, may help simplify the optical design of optical filter 300. Further, although optical filter 300 may be pressure balanced, the hydrostatic stress may generate small residual strains in the components comprising optical filter 300, such as filter element 320, and lenses 318 and 316. Thus, the unloaded design values of one or more optical parameters, e.g. numerical aperture (NA), focal length, or index of refraction associated with one or more of filter element 320, lens 316 and lens 318 may be selected such that when the optical filter is in operation at depth where the optical filter is filter is subjected to a hydrostatic stress, the hydrostatic stress-induced changes in these values, if any, conform optical filter 300 to the desired optical performance. Stated otherwise, one or more of these parameters may have a preselected first value in the absence of hydrostatic stress on optical filter 300 and a preselected second value in the presence of hydrostatic stress at a preselected depth of a water body. The second value may be an operating value of the parameter. For example, an unloaded reflective band center frequency may be preselected such that under an operational hydrostatic stress, a preselected loaded reflective band center frequency may be obtained in response to hydrostatic stress induced changes in refractive indices, for example. Also, in at least some embodiments, optical filter 300 optionally may be overmolded with a polymer, thermoplastic or other suitable material. Such overmolding may provide further protection against environmental exposure to humidity, immersion in water, or condensation.

Figure 4:
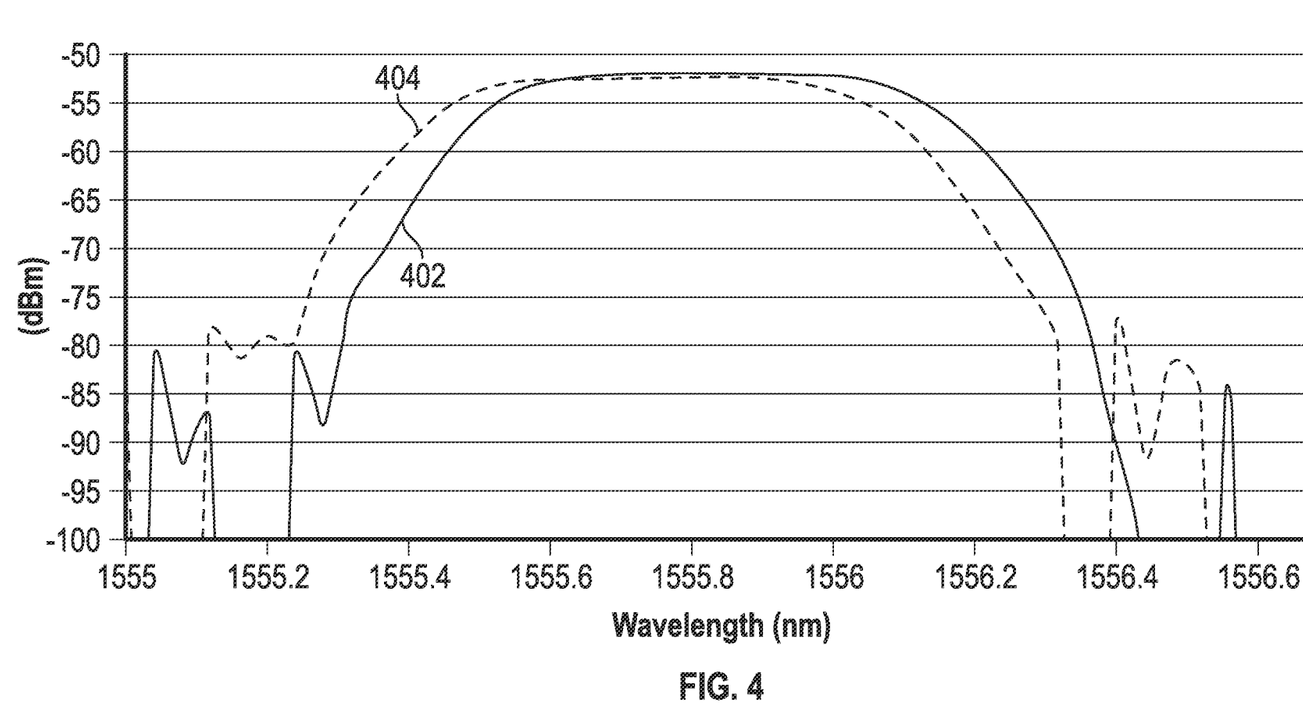
FIG. 4 shows a graph of a filter reflective band in accordance with at least some embodiments.

To further appreciate the principles of the disclosure, refer to FIG. 4 showing graphs of an exemplary reflective band of an optical filter in accordance with at least some embodiments. Curves 402 (solid) and curve 404 (dashed), plot the relative optical power in decibels relative to one milliwatt (dBm) on the ordinate, or "vertical" axis versus wavelength of the optical energy, in nanometers (nm) on the abscissa, or "horizontal" axis. As described above, an optical filter deployed in a hydrocarbon reservoir monitoring system used in marine environments may be subject to hydrostatic stress and curves 402 and 404 represent, respectively, the reflective band in the absence of a hydrostatic stress, i.e. 0 pounds-per-square inch (psi), and under a hydrostatic stress of 2000 psi. In the example of FIG. 4, a source relative power of −24 dBm was used (not shown in FIG. 4). In this example, the reflective band exhibits a shift of the center wavelength with applied hydrostatic pressure of about 0.013 nm at 2000 psi, or a pressure coefficient of about $2.2 \times 10^{-9}$ nm/psi.

Figure 5:
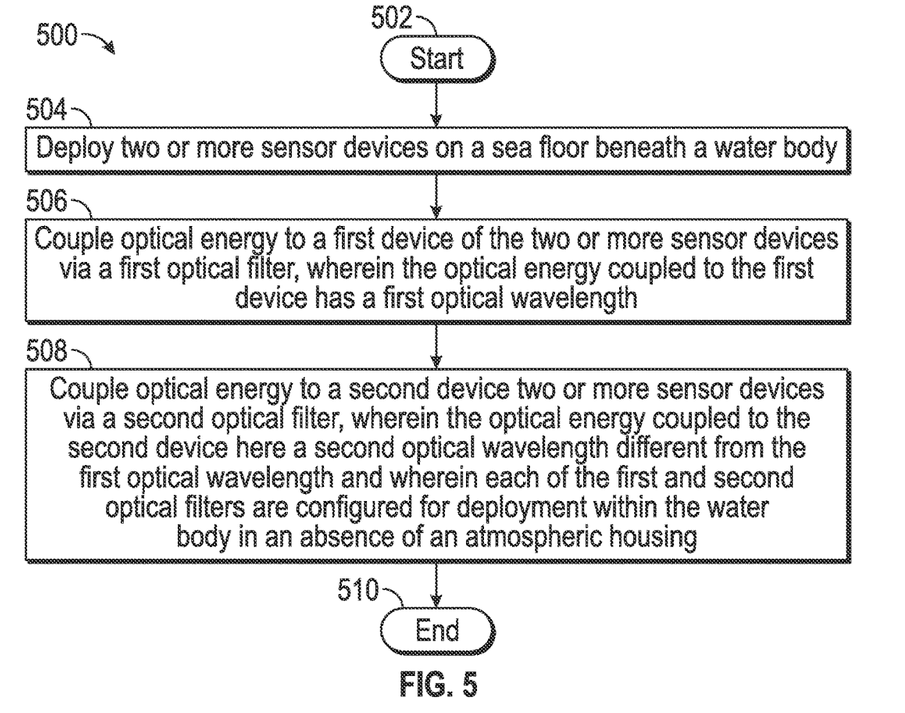
FIG. 5 shows a flow chart of a method in accordance with at least some embodiments.

Turn now to FIG. 5, showing a flow chart of a method 500 in accordance with at least some embodiments. Method 500 starts at block 502. Two or more sensor devices may be deployed on a sea floor beneath a water body, block 504. As previously described, sensor devices may be passive, and optical energy comprising a plurality of optical wavelengths may be coupled to a first device of the to the two or more sensor devices via a first optical filter, wherein the optical energy coupled to the first device has a first optical wavelength, block 506. At block 508, optical energy may be coupled to a second device of the two or more sensor devices via a second optical filter, wherein the optical energy coupled to the second device has a second optical wavelength different from the first optical wavelength. Each of the first and second optical filters may be disposed within the water body without an atmospheric housing. In other words, the first and second optical filters may be deployed in the absence of an atmospheric housing. Data may be modulated onto the optical energy by the sensor devices and returned to a computer system on the surface of the water body as described hereinabove.

In at least some embodiments, the first and second optical filters without an optical housing may comprise pressure-balanced optical filters. For example, as described in conjunction with FIG. 3, each pressure-balanced optical filter may include a filter element and a first lens configured to receive optical energy reflected from the filter element. The optical energy reflected from the filter element may be within a reflective band of the filter element. Each optical filter may also include a second lens configured to receive optical energy transmitted by the filter element. Further, the filter element of the first optical filter may have a reflective band including the first optical wavelength and the filter element of the second optical filter may have a reflective band including the second optical wavelength. In each optical filter, the filter element, first lens and second lens may be disposed within an outer shell, and together therewith comprise a boundary of an internal fluid-filled volume. In at least some embodiments, the internal fluid-filled volume may contain a low index of refraction liquid polymer having, for example, an index of refraction in the range of 1 to 1.3. Further, the optical filters may be configured such that, under hydrostatic stress, one or more of the optical parameters of the first and second lenses, such as numerical aperture, focal length or index of refraction may have a preselected value in response to the hydrostatic stress.

Figure 6:
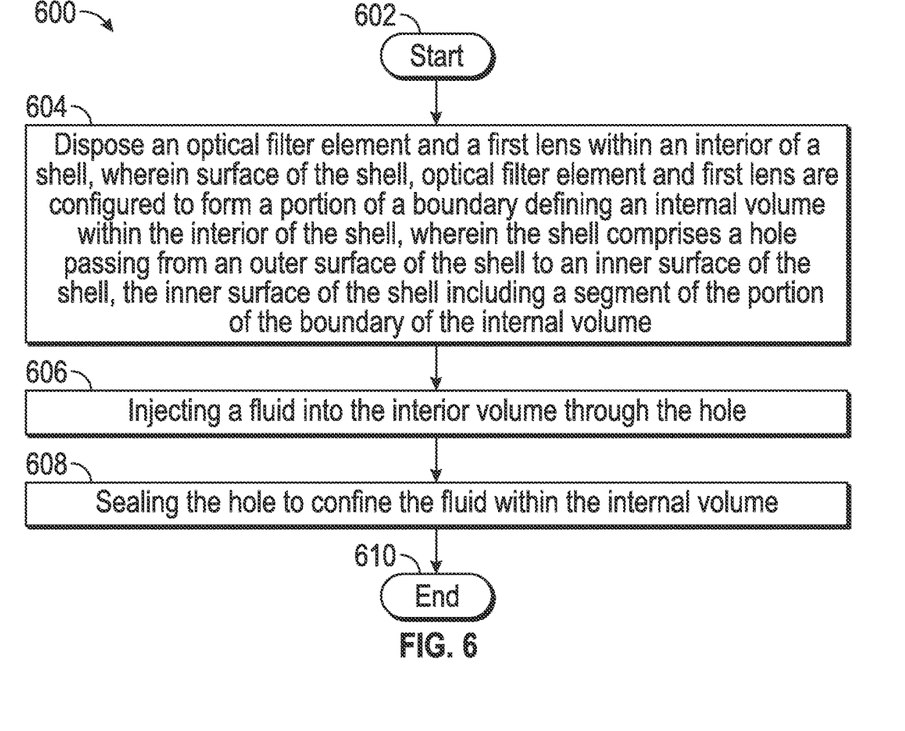
FIG. 6 shows a flow chart of another method in accordance with at least some embodiments.

Refer now to FIG. 6 illustrating a flow chart of a method 600 in accordance with at least some embodiments. Method 600 starts at block 602. In block 604, a filter element and a first lens are disposed within an interior of a shell. The shell, filter element and first lens may be configured to form a portion of a boundary of an internal volume within the interior of the shell. The shell may comprise a hole passing from an external surface of the shell to an inner surface of the shell. The inner surface of the shell may include a segment of the portion of the boundary of the internal volume. Fluid may be injected into the internal volume through the hole, bock 606. In at least some embodiments, the fluid may be injected under vacuum. The hole may be sealed to confine the fluid to the internal volume, block 608. Method 600 ends at block 610, wherein the combined filter element, shell, first lens and fluid-containing internal volume define at least a portion of an optical filter. As described above, exemplary fluids may include liquid polymers. Liquid polymers having a low index of refraction, for example less than 1.3, may be used.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, although low index fluids and other materials have been described, different materials may be used. It is intended that the following claims be interpreted to embrace all such variations and modifications.

What is claimed is:

1. A device comprising:
   a filter element configured to receive optical energy from a first optical fiber, wherein the filter element is reflective in a preselected band of optical wavelengths;
   a first lens configured to receive optical energy transmitted through the filter element;
   a shell disposed about the filter element and the first lens, wherein surfaces of the first lens, the filter element and the shell form a first boundary portion of an internal volume of an interior of the shell; and
   a fluid sealably disposed within the internal volume, wherein the fluid includes a liquid polymer having an index of refraction in the range of 1 to 1.3.

2. The device of claim 1 further comprising a second optical fiber configured to receive optical energy in the preselected band of optical wavelengths reflected from the filter element.

3. The device of claim 2 further comprising:
   a second lens disposed between the first optical fiber and the filter element, a surface of the second lens forming a second boundary portion of the internal volume, wherein the second lens is configured to receive optical energy from the second optical fiber and form a collimated beam of optical energy impinging on the filter element.

4. The device of claim 3 further comprising a third optical fiber configured to receive optical energy transmitted through the filter element via the first lens.

5. The device of claim 1 wherein the first lens has at least one optical parameter selected from the group consisting of:
   a focal length;
   a numerical aperture; and
   an index of refraction; and wherein
   the at least one parameter comprises a first preselected value in the absence of a hydrostatic stress on the device, and a second preselected value in the presence of a hydrostatic stress defined at a preselected depth of a water body, the second preselected value comprising an operating value of the at least one parameter.

6. The device of claim 4 wherein the first optical fiber is disposed within a first ferrule, the first ferrule disposed within a second ferrule, the shell disposed about the second ferrule, and an outer surface of the second ferrule forming a third boundary portion of the internal volume.

7. The device of claim 6 wherein the third optical fiber is disposed within a third ferrule, the third ferrule disposed within a fourth ferrule, the shell disposed about the fourth ferrule, and an outer surface of the fourth ferrule forming a fourth boundary portion of the internal volume.

8. The device of claim 1 wherein the filter element comprises a thin film optical filter.

9. A method comprising:
   deploying two or more sensor devices proximate to a sea floor beneath a water body;
   coupling optical energy to a first device of the two or more sensor devices via a first optical filter, wherein the optical energy coupled to the first device has a first optical wavelength; and
   coupling optical energy to a second device of the two or more sensor devices via a second optical filter, wherein the optical energy coupled to the second device has a second optical wavelength different than the first optical wavelength; and
   wherein each of the first and second optical filters are configured for deployment in the water body in an absence of an atmospheric housing;
   wherein:
   the first and second optical filters each comprise a pressure-balanced optical filter;
   each pressure-balanced optical filter comprises:
   a filter element;
   a first lens configured to receive optical energy reflected from the filter element and wherein the optical energy reflected from the filter element is within a preselected reflective band of optical wavelengths of the filter element; and
   a second lens configured to receive optical energy transmitted by the filter element; and wherein
   the filter element, first lens and second lens are disposed within an outer shell, and together therewith include surfaces comprising a plurality of boundary portions of an internal fluid-filled volume.

10. The method of claim 9 wherein the filter element of the first optical filter has a preselected reflective band of optical wavelengths including the first optical wavelength and the filter element of the second optical filter has a preselected reflective band of optical wavelengths including the second optical wavelength.

11. The method of claim 9 wherein the internal fluid-filled volume contains a low-refractive index liquid polymer.

12. The method of claim 11 wherein the liquid polymer has an index of refraction in the range of 1 to 1.3.

13. The method of claim 9 wherein the second lens is configured to have at least one optical parameter having a preselected value in response to subjecting a pressure-balanced optical filter to a hydrostatic stress, the at least one optical parameter selected from the group consisting of:
   a numerical aperture;
   index of refraction; and
   focal length.

14. A method comprising:
   disposing a filter element and a first lens within an interior of a shell;
   wherein the shell, filter element and first lens are configured to form a portion of a boundary of an internal volume within the interior of the shell, wherein surfaces of the shell, filter element and first lens are configured to form the portion of the boundary defining the internal volume, and
   wherein the shell comprises a hole passing from an external surface of the shell to portion of an inner surface of the shell comprising a segment of the boundary of the internal volume;
   injecting a fluid into the internal volume through the hole, under vacuum; and
   sealing the hole to confine the fluid within the internal volume.

15. The method of claim 14 wherein the fluid comprises a low index of refraction liquid polymer.

16. The method of claim 15 wherein the liquid polymer has an index of refraction in the range of 1 to 1.3.

17. A device comprising:
   a filter element configured to receive optical energy from a first optical fiber, wherein the filter element is reflective in a preselected band of optical wavelengths;
   a first lens configured to receive optical energy transmitted through the filter element;
   a shell disposed about the filter element and the first lens, wherein surfaces of the first lens, the filter element and the shell form a first boundary portion of an internal volume of an interior of the shell;
   a fluid sealably disposed within the internal volume;

a second optical fiber configured to receive optical energy in the preselected band of optical wavelengths reflected from the filter element; and a second lens disposed between the first optical fiber and the filter element, a surface of the second lens forming a second boundary portion of the internal volume, wherein the second lens is configured to receive optical energy from the second optical fiber and form a collimated beam of optical energy impinging on the filter element.

18. The device of claim 17, further comprising a third optical fiber configured to receive optical energy transmitted through the filter element via the first lens.

19. The device of claim 17, wherein the fluid includes a liquid polymer having an index of refraction in the range of 1 to 1.3.

20. The device of claim 17, wherein the first lens has at least one optical parameter selected from the group consisting of:

a focal length;
a numerical aperture; and
an index of refraction; and wherein the at least one parameter comprises a first preselected value in the absence of a hydrostatic stress on the device, and a second preselected value in the presence of a hydrostatic stress defined at a preselected depth of a water body, the second preselected value comprising an operating value of the at least one parameter.

21. The device of claim 18, wherein the first optical fiber is disposed within a first ferrule, the first ferrule disposed within a second ferrule, the shell disposed about the second ferrule, and an outer surface of the second ferrule forming a third boundary portion of the internal volume.

22. The device of claim 21, wherein the third optical fiber is disposed within a third ferrule, the third ferrule disposed within a fourth ferrule, the shell disposed about the fourth ferrule, and an outer surface of the fourth ferrule forming a fourth boundary portion of the internal volume.

* * * * *